United States Patent [19]

Moyroud

[11] 4,248,509

[45] Feb. 3, 1981

[54] PHOTOCOMPOSING DEVICE AND METHOD

[76] Inventor: Louis M. Moyroud, Delray Beach, Fla. 33444

[21] Appl. No.: 24,731

[22] Filed: Mar. 28, 1979

Related U.S. Application Data

[63] Continuation-in-part of Ser. No. 617,847, Sep. 29, 1975, Pat. No. 4,162,846, and Ser. No. 763,611, Jan. 28, 1977, Pat. No. 4,119,977.

[51] Int. Cl.[3] .......... G03B 23/00; G03B 17/06

[52] U.S. Cl. .......... 354/10; 354/15

[58] Field of Search .......... 355/1; 354/4, 5, 6, 354/7, 8-14, 15, 17, 18, 19

[56] References Cited

U.S. PATENT DOCUMENTS

| | | | |
|---|---|---|---|
| 2,917,980 | 12/1959 | Grube et al. | 354/17 |
| 3,008,391 | 11/1961 | Grube | 354/9 |
| 3,480,366 | 11/1969 | Norgren | 354/5 X |
| 3,590,705 | 7/1971 | Moyroud | 354/15 X |
| 3,631,775 | 1/1972 | Tidd | 354/10 |
| 3,643,559 | 2/1972 | Moyroud | 354/6 |
| 3,668,984 | 6/1972 | Rosin | 354/10 |
| 3,780,630 | 12/1973 | Nakajima | 354/5 |
| 3,836,917 | 9/1974 | Mee | 354/5 |
| 4,027,313 | 5/1977 | Klepper et al. | 354/15 |
| 4,040,066 | 8/1977 | Brill et al. | 354/10 |
| 4,067,022 | 1/1978 | Ebner | 354/7 |

FOREIGN PATENT DOCUMENTS

| | | | |
|---|---|---|---|
| 323202 | 6/1975 | Austria | 354/6 |

*Primary Examiner*—Donald A. Griffin

*Attorney, Agent, or Firm*—Curtis, Morris & Safford

[57] ABSTRACT

Lens alignment means is provided whereby mis-alignment is amplified by a lens system, is detected by a photocell array, is electrically encoded, and the coded information is stored and used to correct electronically the character placement so as to properly position characters on the film. A detailed description of this feature appears herein under the heading "CHARACTER ALIGNMENT", and in FIGS. 18 through 20 of the drawings. Master characters are packed more densely on the matrix by allocating each an area comprising one-third to two-thirds of the usual character area, and using a separate illumination device to illuminate each such separate area. The illumination devices can be energized in different combinations to illuminate characters of various sizes. A detailed description of this feature appears herein under the heading "CONCENTRATION OF MASTER CHARACTERS", and in FIGS. 34 through 40 of the drawings.

9 Claims, 40 Drawing Figures

FIG.4
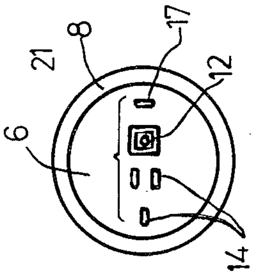
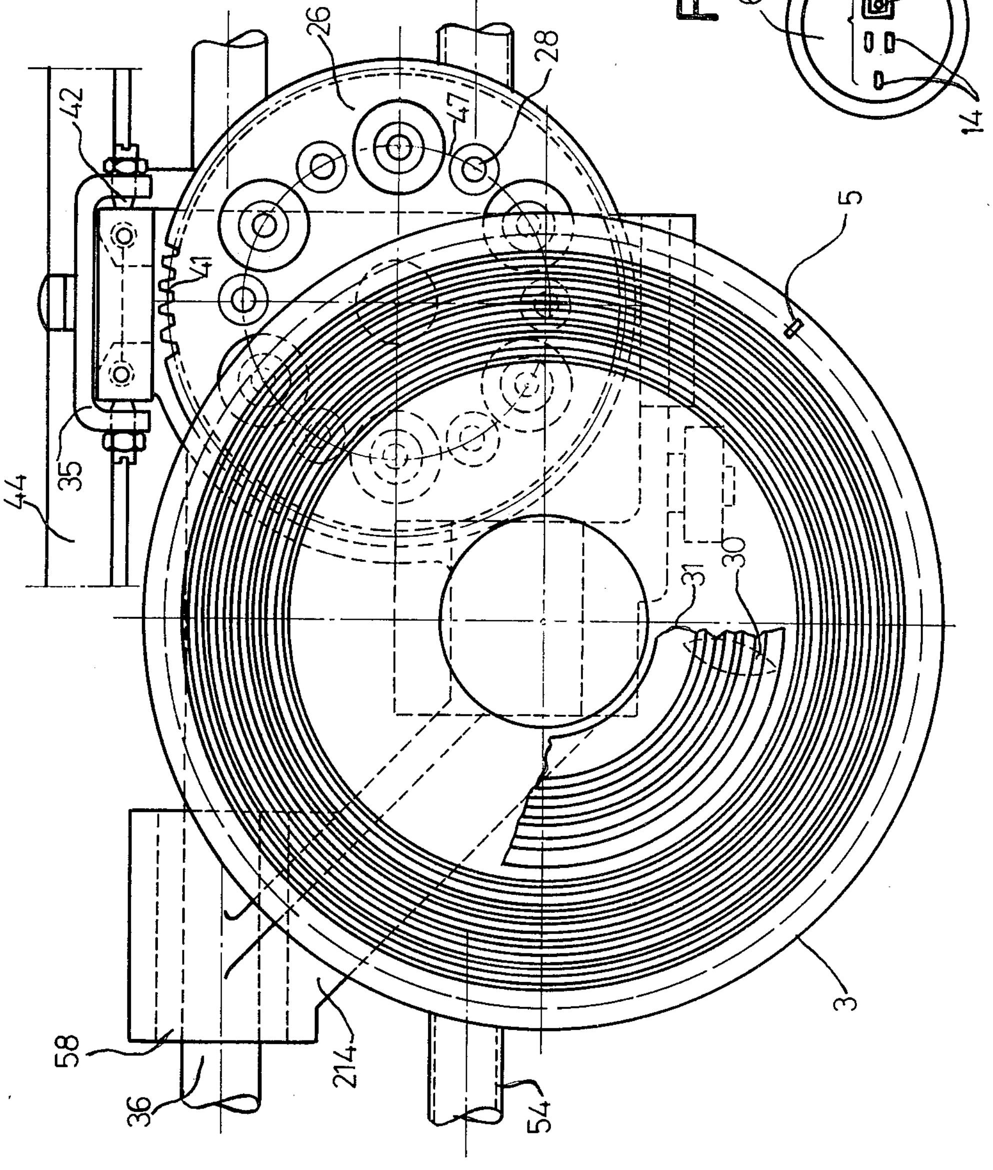
FIG.5

FIG.9
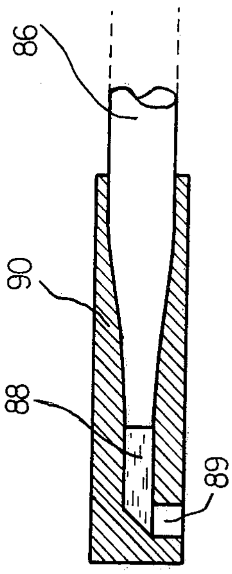
FIG.10
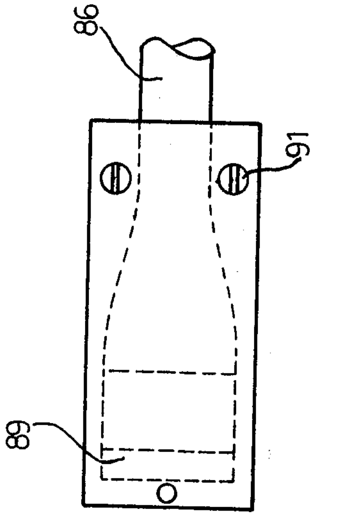
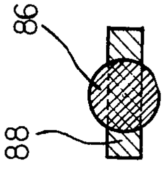
FIG.11

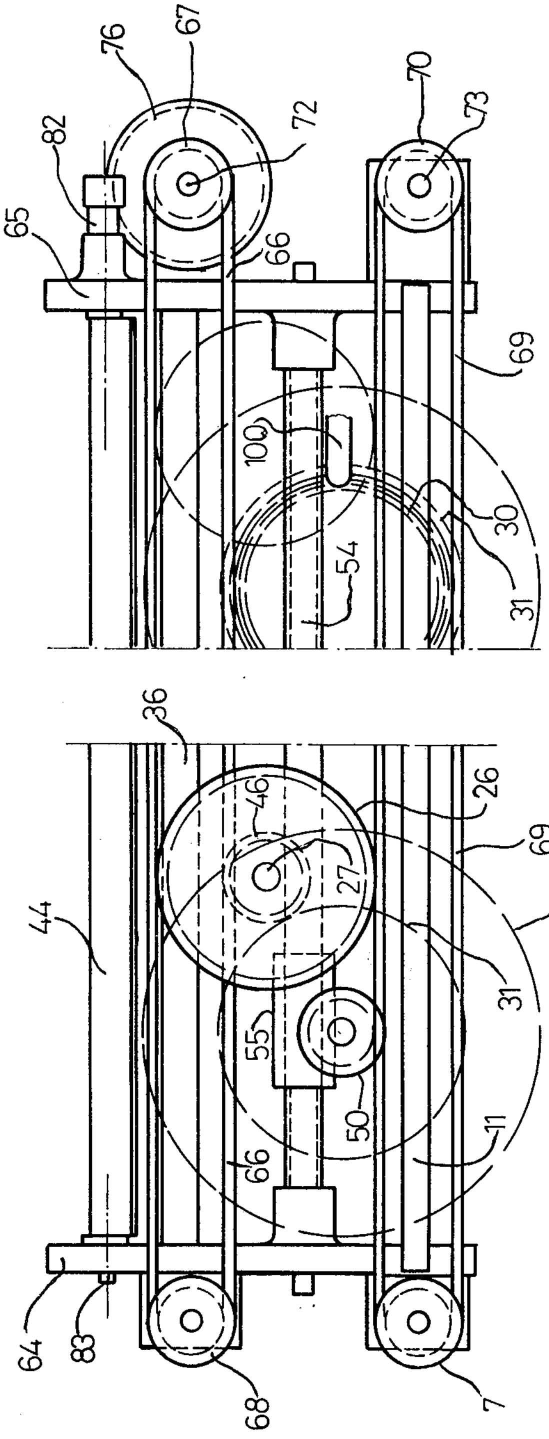
FIG.12
FIG.13
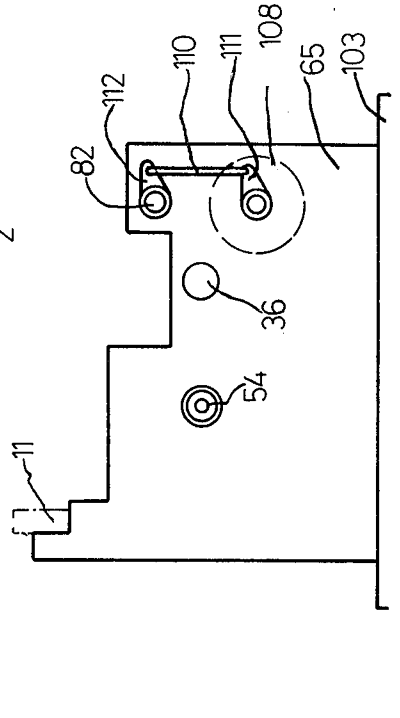

FIG.20
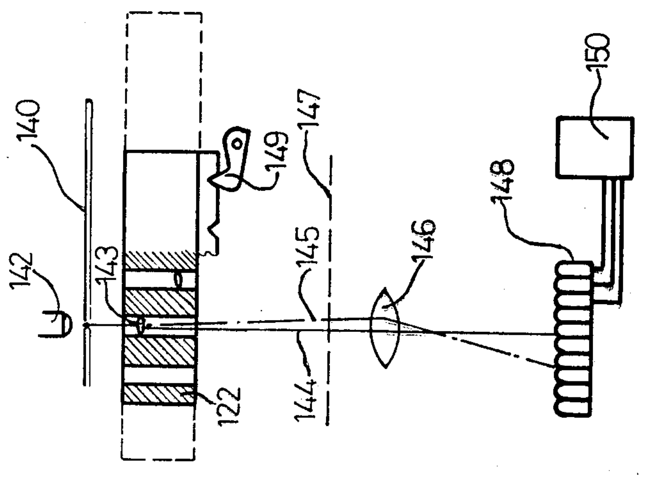
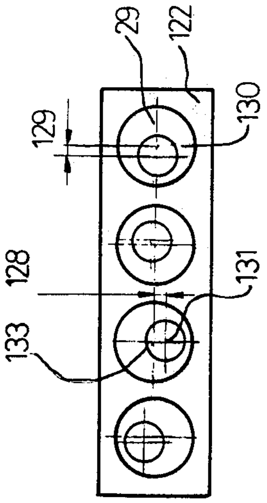
FIG.18
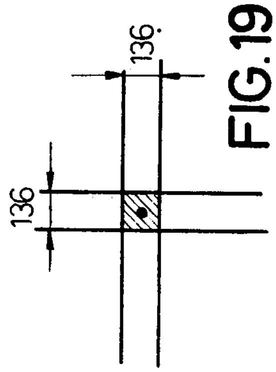
FIG.19

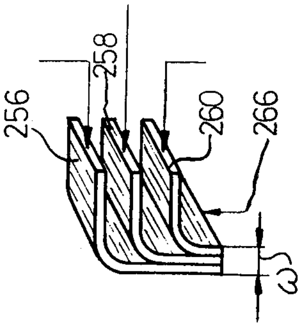
FIG.39
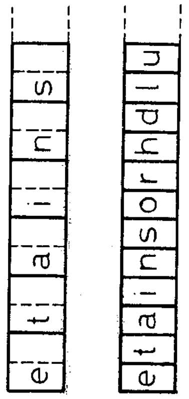
FIG.37
FIG.38
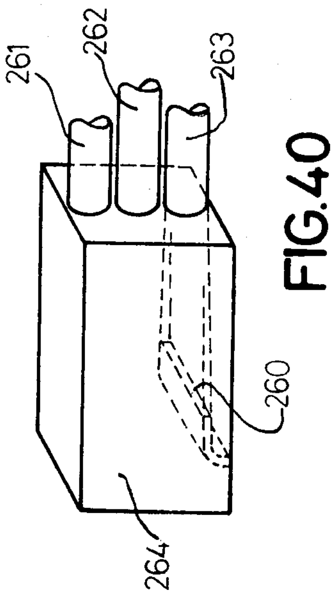
FIG.40
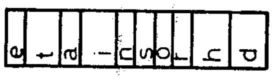
FIG.36
FIG.35
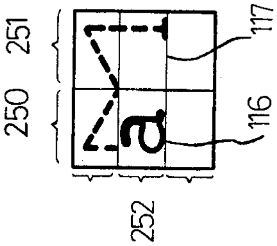
FIG.34

PHOTOCOMPOSING DEVICE AND METHOD

This application is a continuation-in-part of U.S. Patent Applications Ser. No. 617,847, filed Sept. 29, 1975, now U.S. Pat. No. 4,162,846, and Ser. No. 763,611, filed Jan. 28, 1977, now U.S. Pat. No. 4,119,977. The disclosures of those patent applications and patents hereby are incorporated herein by reference.

This invention relates to photographic type-composition and has for its objective various improvements in this art, more especially, various improvements in and modifications of a photographic type composing machine such as is disclosed in the above identified U.S. Patent Application Ser. No. 617,847 and U.S. Pat. No. 4,162,846 (hereinafter referred to, for convenience, as "application Ser. No. 617,847").

One specific object of the invention is to facilitate the use of such a machine to produce composition containing unusual or infrequently used characters such as symbols and scientific notations-so-called "Pi-characters". A related object is to provide relatively simple means for accurately forming horizontal and vertical line or "rules".

A further object is to provide such a machine with a larger number of lenses, thus increasing the versatility of the machine.

Another object is to provide such a machine having a simplified lens structure, but without loss of versatility in style selection.

Yet another object is to provide a simplified means and method for lens alignment and correction of errors caused by lens mis-alignment.

A still further object is to provide a means and method for increasing the capacity of the character matrix disc without detrimental effects on the operation of the photocomposing equipment.

Another object is to provide a means for storing width and other data for a disc together with the disc so as to avoid the need for character width tapes and the like to read character width information into the machine.

In accordance with the present invention, the foregoing objectives are met by the provision of an auxiliary matrix for special characters ("pi-characters") which can be enabled simply by operation of the same character spacing mechanism which is used to change styles and/or sizes. Rules are formed neatly and accurately by shining a lamp continuously through a slot in the "pi-matrix" while operating either the character spacing or line spacing mechanism.

A lens turret is provided to increase the number of lenses available in the machine. The turret is rotated for lens and/or style changing by action of the character spacing mechanism.

A simplified machine is provided in which the positions of the lenses are fixed relative to the character matrix. Character row changes are made by means of a movable shutter band which enables one and only one lens and row combination at a time.

Lens alignment and alignment error correction by electrical means greatly simplify the solution of the lens alignment problems.

The capacity of the character matrix is increased by dividing the usual character area into zones, and utilizing only those zones necessary. Each zone is illuminated by separate illumination means, and adjacent zones and illumination means are combined for storing and illuminating characters utilizing more than one zone.

Data such as width information is stored optically or magnetically in tracks on the character matrix disc, thus avoiding the need for program tapes, etc. for this purpose.

Pie-shaped disc segments, each containing at least one font of characters, are used to increase the versatility of each character matrix disc.

The foregoing and other objects and advantages will be set forth in or apparent from the following description and drawings:

In the drawings:

FIG. 4 is a plan view of Pi-character-bearing matrix plate;

FIG. 5 is a top plan view of another machine using a lens turret and a disc with coded information storage;

FIG. 9 is a cross-sectional view of a light pipe for illuminating characters in the machines of FIGS. 1 through 8;

FIG. 10 is a top plan view of the light pipe of FIG. 9;

FIG. 11 is a schematic cross-sectional view of the light pipe of FIGS. 9 and 10;

FIG. 12 is a schematic representation of the mechanical controls for the device of FIGS. 5 through 8;

FIG. 13 is a schematic end view of the frames of the above-identified machine;

FIG. 18 is a schematic representation of a lens holder for use with the invention;

FIG. 19 is a schematic representation illustrating lens positioning tolerances;

FIG. 20 is a schematic representation of a lens alignment error detection and measurement system;

FIG. 34 represents the maximum character area for master character location on the matrix;

FIG. 35 is a schematic representation of the normal vertical spacing of master characters on the disc;

FIG. 36 is a schematic representation of improved vertical spacing of master characters on the disc;

FIG. 37 is a schematic representation of the normal horizontal spacing of master characters on the disc;

FIG. 38 is a schematic representation of improved horizontal spacing of master characters on the disc;

FIG. 39 represents an illuminating arrangement for unequally spaced characters; and FIG. 40 is a schematic representation of an illuminating unit for illuminating characters.

GENERAL DESCRIPTION

Figure 1:
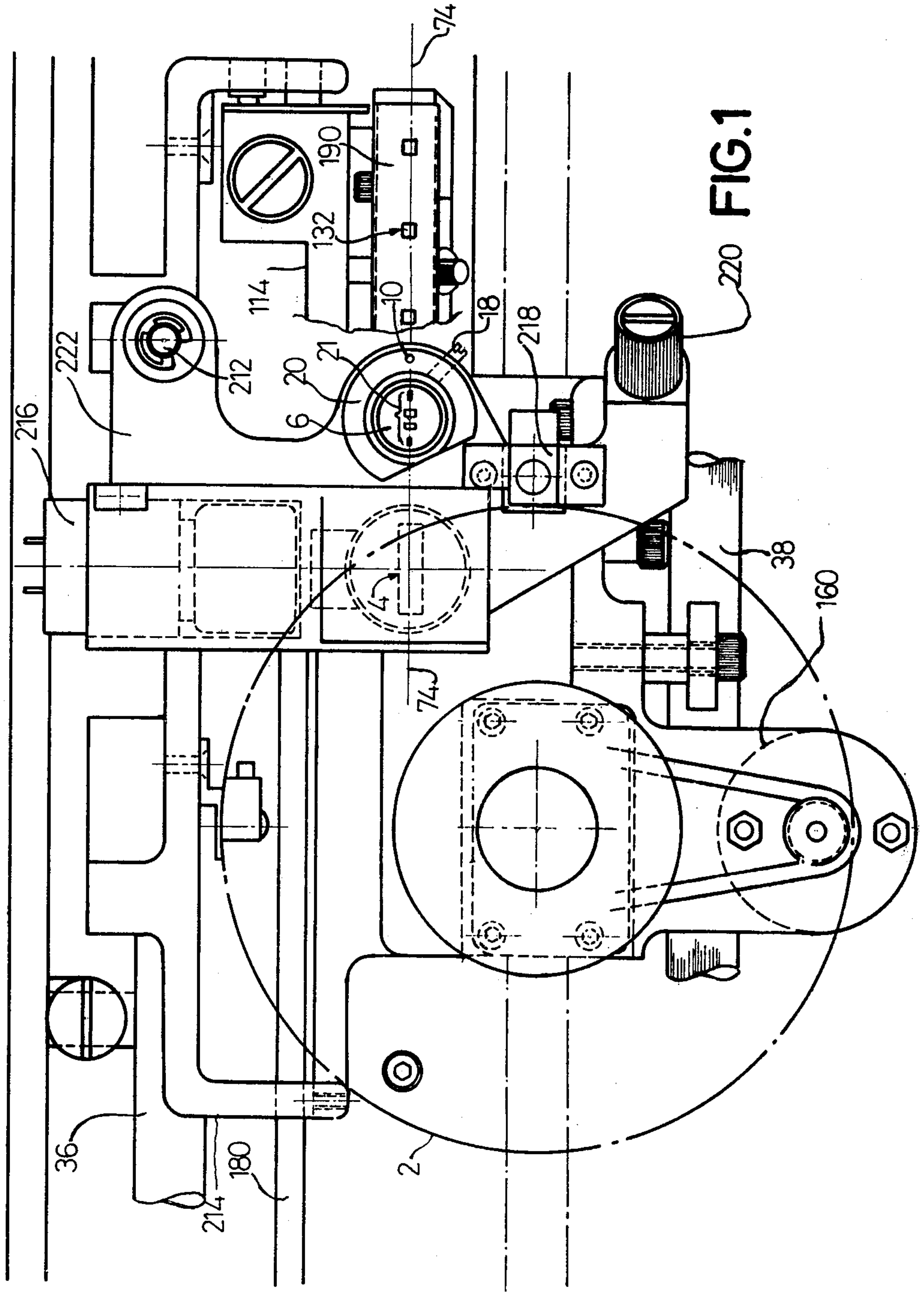
FIG. 1 is a top plan view, partially broken-away, of the photocomposing machine of the invention with a Pi-character attachment.

FIGS. 1 to 4 illustrate a modification of the machine described in U.S. patent application Ser. No. 617,847, filed Sept. 29, 1975. In these drawings, the same reference numerals are used for the corresponding elements of said prior patent application, the disclosure of which is incorporated herein by reference. For the convenience of the reader, a brief description of the salient features of the device of the prior application will be given below.

Figure 2:
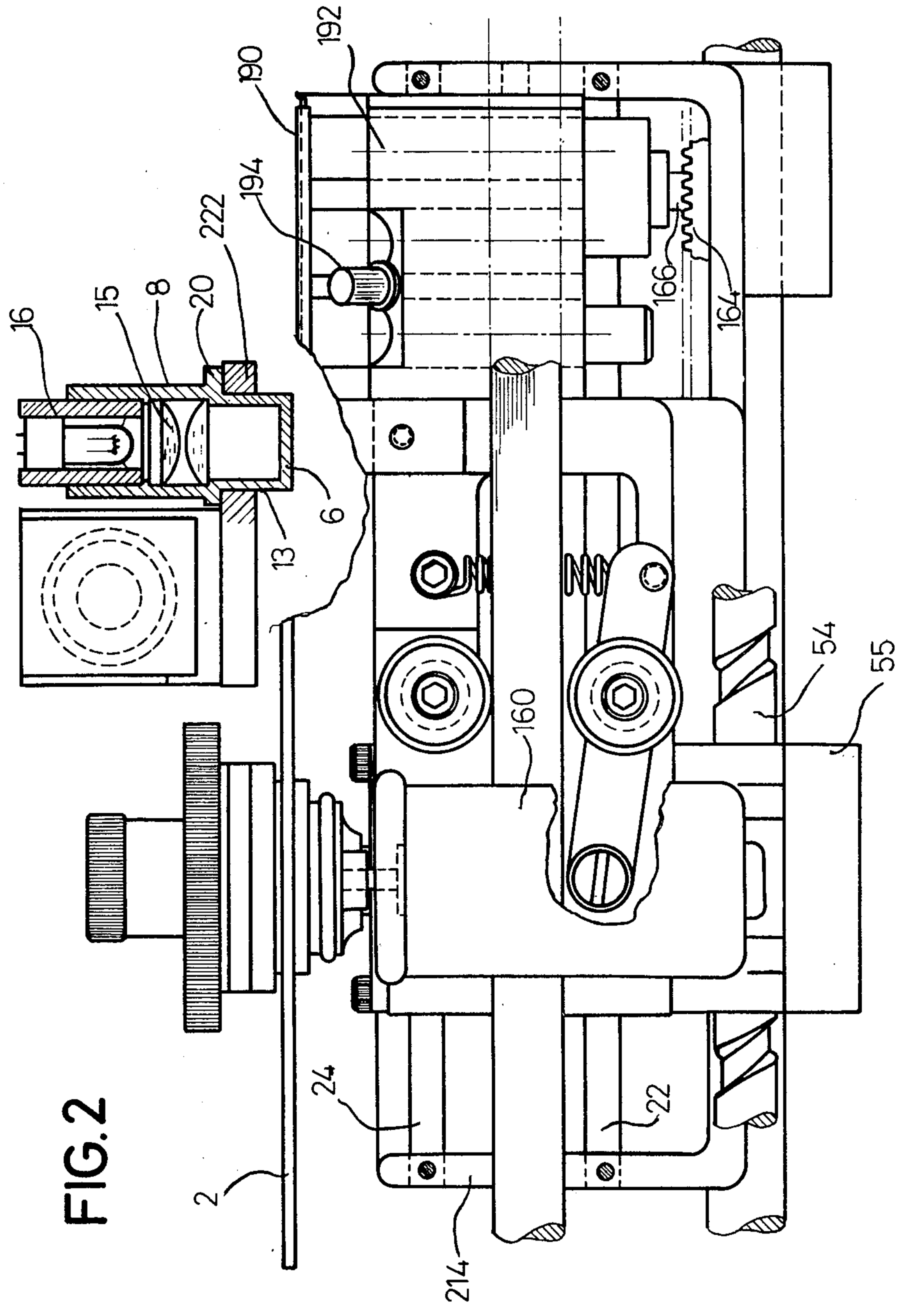
FIG. 2 is a front elevation view, partially broken-away, of the machine of FIG. 1.
Figure 3:
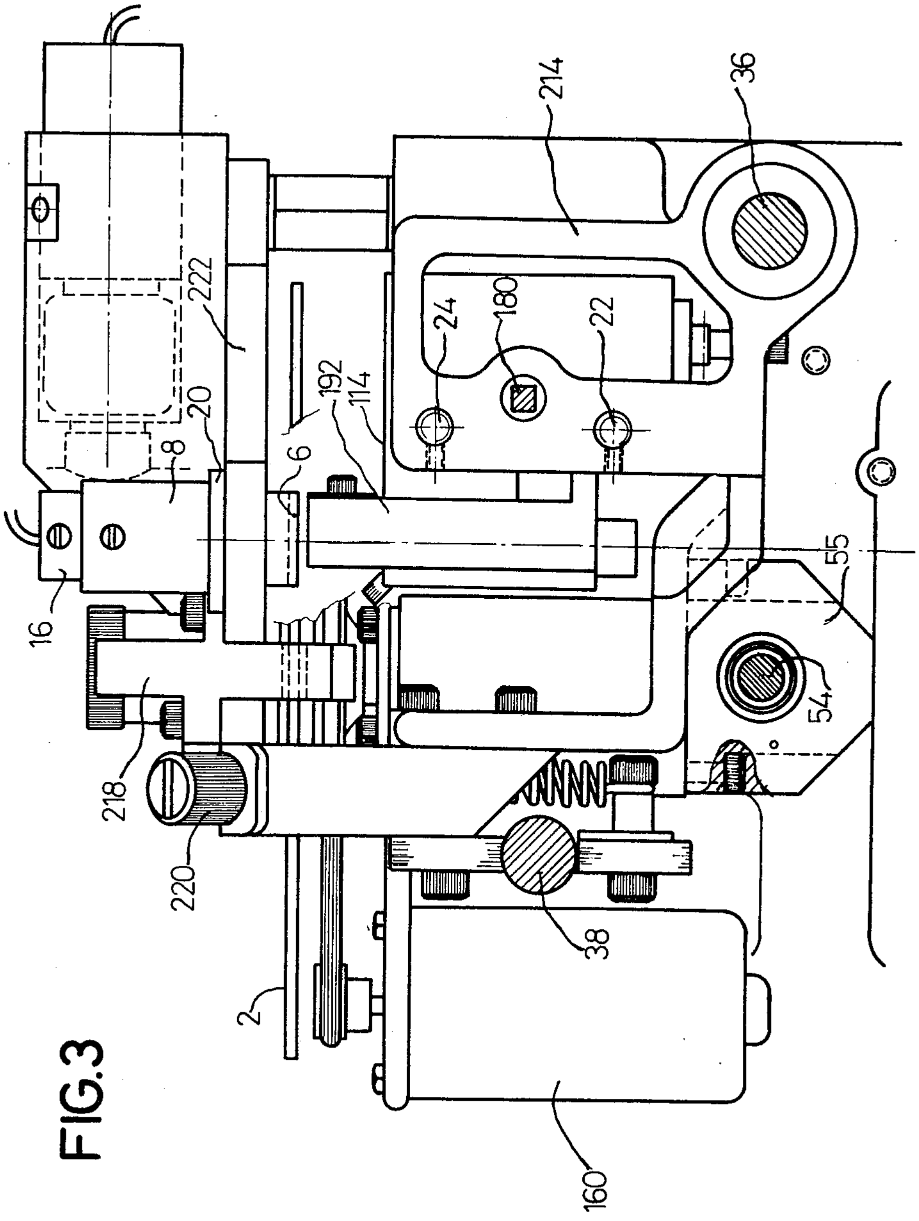
FIG. 3 is a side elevation view, partially in cross-section, of the machine of FIG. 1.

As it is shown most clearly in FIGS. 1 through 3, a disc 2 is rotated continuously by a motor 160, and the motor and disc are mounted on a carriage 214. The carriage 214 is moved along rails 36 and 38 by variable amounts, for character spacing purposes, by means of a lead screw 54 (FIG. 2) engaging a nut mounted in a block 55. As it is explained in the above-mentioned patent application, the character spacing carriage 214 is provided with rails 22 and 24 (FIG. 2) on which a lens carriage 114 is slidably mounted. The carriage 214 is provided with an interchangeable lens pack 192 containing lenses of different focal lengths. These lenses are aligned along a projection line 74 (FIG. 1).

The relative positions of the carriages 214 and 114 can be changed for the selection of one of several rows of characters on the disc, and/or for the selection of a given lens to provide a given magnification ratio.

The two carriages are normally locked together positively by the engagement of a plunger 166 (FIG. 2) mounted on the lens carriage 114 with a rack 164 which is mounted on the character-spacing (or main) carriage 214. The locking mechanism can be released by the operation of an unlocking bar 180.

The characters are illuminated by a flash produced by a flash unit 216 mounted on an arm 222 which is provided at 212. The arm 222 is releasably secured to the main carriage frame by means of a thumb-screw 220. The exact timing of the flash is obtained by an exciter lamp-photodiode assembly 218 operating in cooperation with timing slits on the disc 2, as was originally described in British Pat. No. 669,556, and is now widely used.

Referring to FIG. 1, the flash unit can illuminate an elongated rectangular zone 4 of the disc. The zone 4 is wide enough to illuminate simultaneously all the characters of the different rows of the disc that are aligned along the projection line 74. The selection of one row to the exclusion of the others is obtained by the use of a shutter plate 190 provided with apertures 132, just wide enough to accept one character and positioned approximately on the optical axis of each lens.

PI CHARACTER AND RULES INSERTION

The improvement shown in FIGS. 1 to 4 resides in the addition of an auxiliary input for the projection of special characters ("Pi" characters) which are not on the disc 2, and for the production of continuous vertical or horizontal lines or "rules".

It is well known that continuous rules of different thicknesses, particularly for the composition of tables, preferably are produced at the same time as the text matter. The method which has been used in prior machines using a rotating character matrix and flash lamp consists of the projection of closely-fitted line segments. However, the results are not of uniformly high quality because often there is either a slight gap between adjacent segments, or there is an undesirable thickened area if the segments overlap even slightly.

The new method of this invention makes it possible to produce unbroken rules by using a light source which is energized continuously while the character spacing or line spacing mechanism also is being operated continuously. The thickness of rules can also be changed by selecting one of the different lenses which are used for determining the size of characters being composed.

The results mentioned above are attained by the provision of a projection area distinct from the normal character projection area 4 (FIG. 1), but preferably located on the same projection line 74 along which the lens array can be moved for style and size selection. As shown in FIGS. 1 and 4, the Pi characters and rule-producing apertures are located at 21, where a group of 4 apertures or Pi-characters are shown, all aligned on line 74. These characters are conveniently produced by photographic means on a circular glass plate or film chip disc 6.

As it is shown in FIG. 2, the disc 6 is cemented to the lower end portion 13 of a cylindrical holder 8 provided with a flange 20. The lower portion 13 of the holder is mounted and accurately centered in a hole of the arm 222. The assembly is located angularly by a pin 10 (FIG. 1) and is secured in place by a set-screw 18. The holder 8 is provided with condensing lenses 15 (FIG. 2) cooperating with an illuminating unit 16 comprising a lamp that can be turned on or off by the control circuit of the machine. The Pi-bearing holder 8 can be removed quickly and replaced by another holder carrying a different Pi-plate 6.

FIG. 4 is an enlarged view of the Pi-plate 6. In this particular Pi-plate, one of the apertures or slots 14 can be illuminated continuously to produce horizontal rules, and the vertical aperture or slot 17 can be used similarly to produce vertical rules. The Pi-character 12 can be illuminated at a given time to project an image at a pre-selected location in the line. This result is obtained in the same way as one of the several rows of disc 2 is selected, as it is explained more fully in co-pending application Ser. No. 617,847. First, the lens carriage 114 is locked to the stationary frame of the machine, and the main carriage 214 bearing the Pi-attachment is moved so that the Pi-character 12 moves along line 74 until its reference point intersects the optical axis of the lens that will produce on the film an image of the desired size. Then the two carriages 114 and 214 are locked together and move as a unit along the guide rails under the action of the lead-screw 54 and the drive motor (not shown) until the optical axis of the selected lens reaches the point in the line where character 12 is to be projected. Then the illuminating lamp of unit 16 is turned on at the appropriate time to produce an exposure.

In order to produce a horizontal rule from an aperture or slot 14, the same procedure is followed except that the two carriages are moved to the point where the rule begins (or ends) and the locked carriages are then continuously moved, while the lamp 16 is turned on, until the other end of the rule is reached. The speed of the carriage unit and the light produced by the illuminating system are programmed to produce a rule of uniform thickness.

To produce a vertical rule using the vertical slot 17, the carriage 214 remains stationary, but the line spacing or film feed mechanism is continuously operated. Otherwise, the operation is the same as for making horizontal rules.

LENS TURRET

The embodiment illustrated in FIGS. 5 to 17 now will be described. The disc shown at 3, in FIG. 5, is provided with 8 circles or rows of characters of different styles plus one row of timing slits 5. Magnetic tracks 30 are located on the unused central portion of the disc. These tracks can be conveniently located on a plastic disc 31 cemented to disc 3. They can contain all the necessary information concerning the character widths of the disc plus some programming information.

A further important difference between the present invention and the arrangement of application Ser. No. 617,847 is that in the present invention a small lens turret 26 (FIG. 5) is utilized rather than a lens slide. The lens turret can be rotated around its axis to select both style and size. The turret is mounted on a shaft 27 (FIG. 6) attached, by ball bearings 56 and 57, to the character spacing carriage unit 7 and its cover plate 9, so that they move in unison for character spacing purposes. In the example shown, the turret can be provided with 12 lenses of different focal lengths, as shown in the developed section of FIG. 8 where each lens center is represented by a cross. Each lens is mounted in a tube 29 and each tube can be correctly positioned lengthwise in its receptacle where it is secured by a set screw.

Referring again to FIG. 6, the lens turret assembly includes a drive wheel 46 and a positioning wheel 34. The latter is provided with teeth engaged by teeth 41 of a locking plate 35, so that, in normal operation, the turret is accurately positioned and positively locked against rotation. The carriage-and-turret assembly can slide above the film plane (not shown) along rails 36 and 11 to properly space characters, as controlled by the electronic section of the machine which operates the spacing motor (not shown). The spacing motor which drives the lead screw 54 cooperates with a threaded block 55 which preferably is attached to the main carriage through resilient means (not shown) to absorb part of the shock in high speed operation.

Ball bushings 58 preferably are used to mount the lens turret assembly on the rail 36 in order to reduce the sliding friction.

Referring now to FIG. 12, the disc 3 is mounted on ball-bearings and is continuously rotated by a sprocketed wheel 50 which is engaged by a belt 69 driven by pulley 70 having a motor shaft, not shown, attached to its shaft 73. Pulley 71 is an idler.

In a similar manner, the lens turret can be rotated by the action of a belt 66 engaging a wheel 46 mounted on the turret shaft. As shown in FIG. 12, belt 66 passes over an idler pulley 68. Another pulley 67 is attached to a lock wheel 76 by a sleeve 78. The assembly is attached by a bracket 80 (FIG. 14) to the end frame of the photocomposing machine. Wheel 76 is normally free to rotate so that, as the carriage moves along for the composition of a line, wheel 46 (FIG. 6), which is mounted on the locke turret, forces the belt 66 to move freely on pulleys 67 and 68. In order to rotate the lens turret, the belt motion is stopped, as will be explained in relation with FIGS. 6, 12 and 14 to 16.

Mounted on the carriage 7 is a rocker plate 35, pivoted at 42 on the carriage frame (see also FIG. 5) and provided with teeth 41 engaging wheel 34 as explained above, so that, in the position shown in FIG. 6, the lens turret is locked in position so that it cannot rotate. The plate is maintained in this normal position by the action of a compression spring 43 which tends to rotate plate 35 clockwise until teeth 41 are firmly meshed with wheel 34.

An extension 37 of plate 35 is provided with a stud upon which a roller 45 is rotatably mounted. Extending for the full length of the carriage travel is a bail 44, pivoted at 83 and 82 (FIG. 12) which can be rotated clockwise to engage roller 45 and thus rotate plate 35 counterclockwise to disengage teeth 41 from engagement with wheel 34, thus allowing the turret to be rotated. The "disengaged" position of plate 35, roller 45 and bail 44 is shown in dashed lines in FIG. 6.

Figure 15:
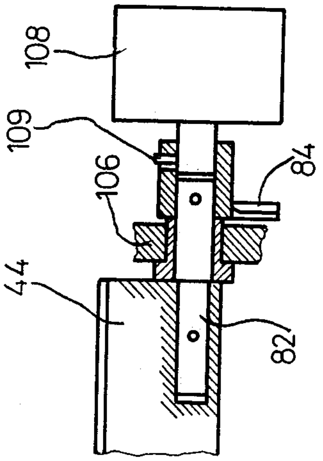
FIG. 15 is a similar view of the locking bail operating mechanism.
Figure 16:
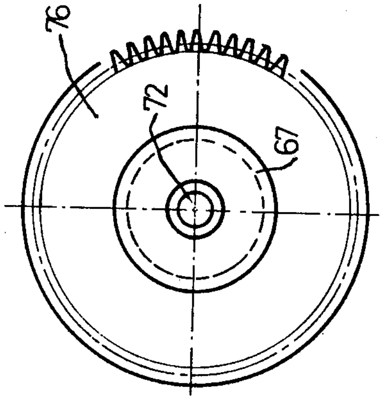
FIG. 16 is a plan view of the lens turret control wheel.
Figure 14:
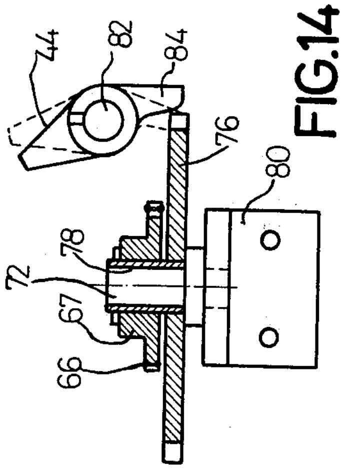
FIG. 14 is a schematic cross-sectional view of the lens turret locking mechanism for the device of FIGS. 5 through 8.

Referring to FIGS. 14 and 15, one end of bail 44 is attached to a shaft 82 which is mounted rotatably in a bushing mounted in the end-plate 106. The hub of a lock pawl 84 is pinned to the extension of shaft 82. Engaging a slot of the hub is a pin 109 which is attached to the shaft of a rotary solenoid 108 so that when the solenoid is activated, pawl 84 and bail 44 are forced to rotate clockwise as shown in FIG. 14, against the action of a spring (not shown).

The operation of the rotary solenoid causes two events to occur in sequence. First, at the beginning of the rotation of shaft 82, the teeth of wheel 76 (also see FIG. 16) are engaged with pawl 84 so that, for a short time both wheel 76 and turret wheel 34 are locked. Then, as the rotation continues, wheel 76 remains locked as pawl 84 continues its travel inside a notch between two teeth, but lens turret wheel 34 is released when the rotation of shaft 82 is complete. At this point, any displacement of the carriage produced by the rotation of the lead screw 54 will cause a rotation of the lens turret because, the wheel 76 is locked, the toothed belt (or plastic chain) 66 (FIG. 12) cannot move and acts like a fixed rack in relation with wheel 46.

Thus any lens can be moved to any position without the use of an additional driving mechanism such as a stepping motor. It is the control of the carriage motion which determined both the size and the character row that will be used. The spacing of the teeth of wheel 34 is such that the rotation of the turret from one tooth to the next will bring a lens from one row to the next row. If the wheel is rotated by six teeth, a lens will be replaced by another without changing the character row.

FIG. 13 shows a variation of FIG. 15. In FIG. 13, the rotary solenoid 108 operates the shaft 82 through levers 111 and 112 which are connected by a pull rod 110. The advantage of this arrangement resides in the fact that the rotation of the solenoid shaft can be leveraged, and in that the axial displacement of the solenoid shaft is absorbed by the pull rod.

Figure 17:
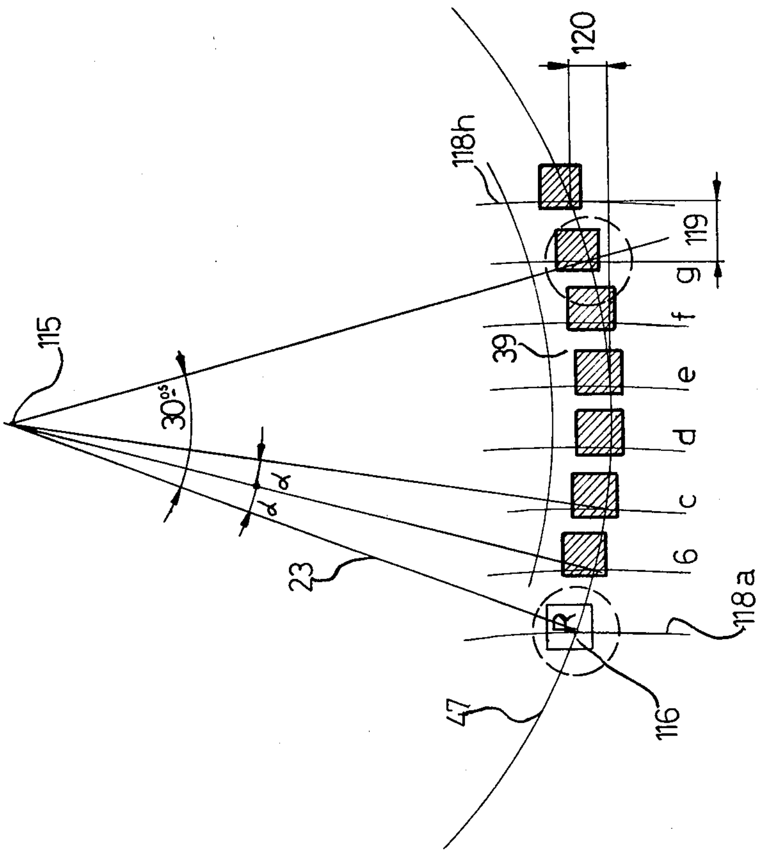
FIG. 17 is a schematic representation of a section of the character matrix.

The passage from one character row of the disc to another by lens turret rotation will usually necessitate a re-positioning of the film which can be accomplished by the forward-backward film feed mechanism or "leading". This is illustrated in FIG. 17 where the eight character rows are shown at **118*a*–118*h*. Each character area is shaded except the first one showing the location of character R and its position in relation to the reference point 116 located at the intersection of the base line and the left-hand vertical reference line of the character. The lens turret pivoting point is shown at 115 and the circle followed by the optical axis of any lens is shown at 47. It can be understood that passage from row 118*a* to row 118*h* or row 118*b* to row 118*g* . . . or row 118*d* to row 118*e* will not require any correction in order to obtain perfect alignment of characters. But passage from row 118*e* to row 118*h*, for example, will necessitate a displacement of the film corresponding to the vertical distance 120**.

Since the distance from row "c" to row "d" or "e" is small, the film motion can be avoided by properly timing the flash so that it does not occur exactly at the time the photodiode pulse is generated, but a few microseconds later. The necessary information concerning the correction by film motion or flash timing is permanently stored in the control circuit of the machine.

The location of the different reference points, that is, the location of each character circle of the disc, is determined by equal angular spacing $\alpha$. For example, with a twelve-lens turret and an eight-row disc, the angle between two consecutive lenses will be 30 degrees, as shown in FIG. 17, and the spacing between consecutive reference points will be 5 degrees (angle $\alpha$).

Figure 6:
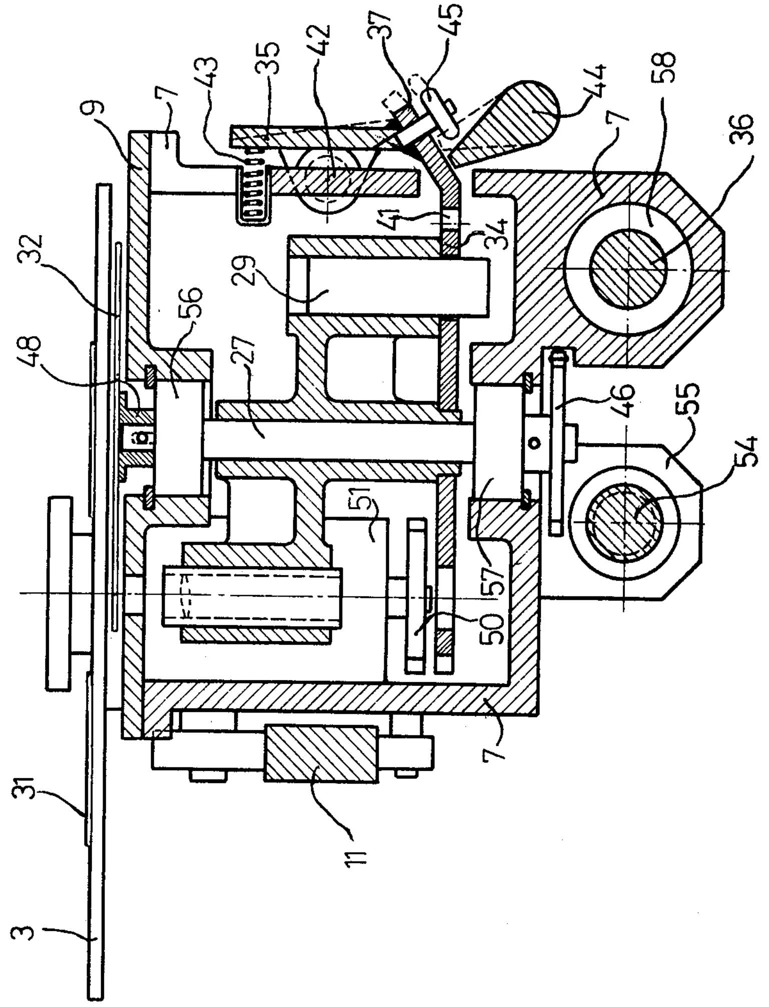
FIG. 6 is a cross-sectional view through the lens turret of FIG. 5.
Figure 8:
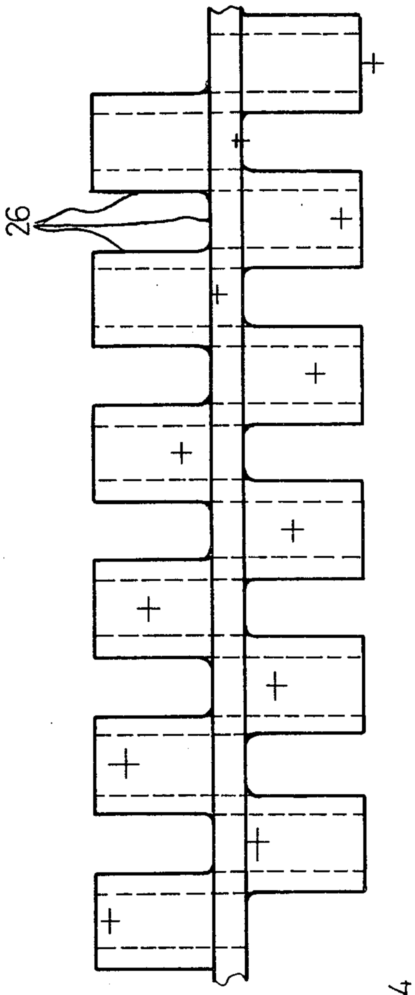
FIG. 8 is a developed section of the lens turret.
Figure 7:
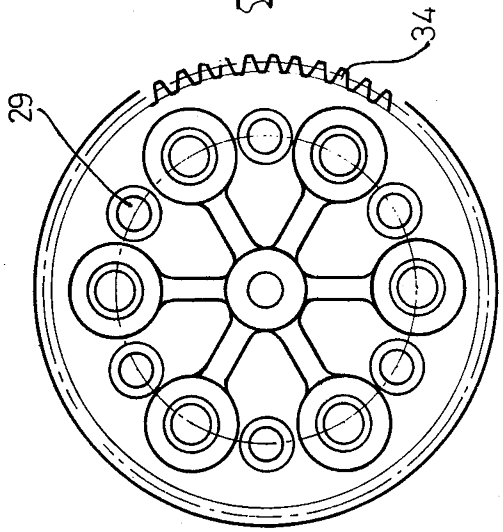
FIG. 7 is a top plan view of the lens turret of FIGS. 5 and 6.
Figure 24:
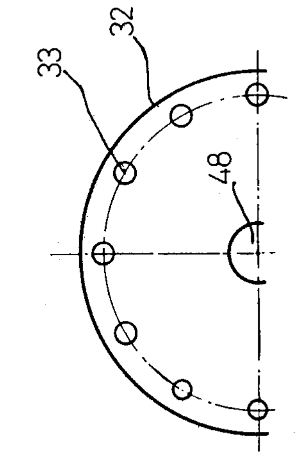
FIG. 24 is a broken-away plan view of a shutter disc for the lens turret.
Figure 23:
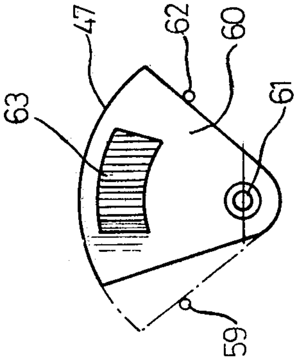
FIG. 23 is a schematic representation of a row-selection shutter for use with the invention.

It can be understood here that if all the rows opposite the projection window 39 are illuminated there will be two lenses in position so that there will be one unwanted image. Different means can be used to avoid this difficulty. Of course, the use of a lesser number of lenses or a lesser number of rows would resolve the problem. But as it is preferred to have at least the number of sizes and number of styles shown, the shutter arrangement of FIG. 23 can be utilized. A shutter plate 60 is pivoted at 61 on the frame of the carriage and has an opening 63 just long enough to restrict to 6 the number of characters that can be illuminated. The shutter plate 60 is mounted between the light pipe block exit 89 and the disc. (This arrangement of parts is not shown). The shutter plate can be operated by a solenoid to move it from its rest position against stop pin 62, where it is maintained by a spring (not shown) to the other position against a second stop pin 59. The light emerging from the flash lamp is further limited to the selected lens by a shutter disc 32 (FIG. 24) provided with apertures 33, one per lens. The disc 32 is mounted on a hub attached to the shaft of the lens turret as shown in FIG. 6.

Figure 21:
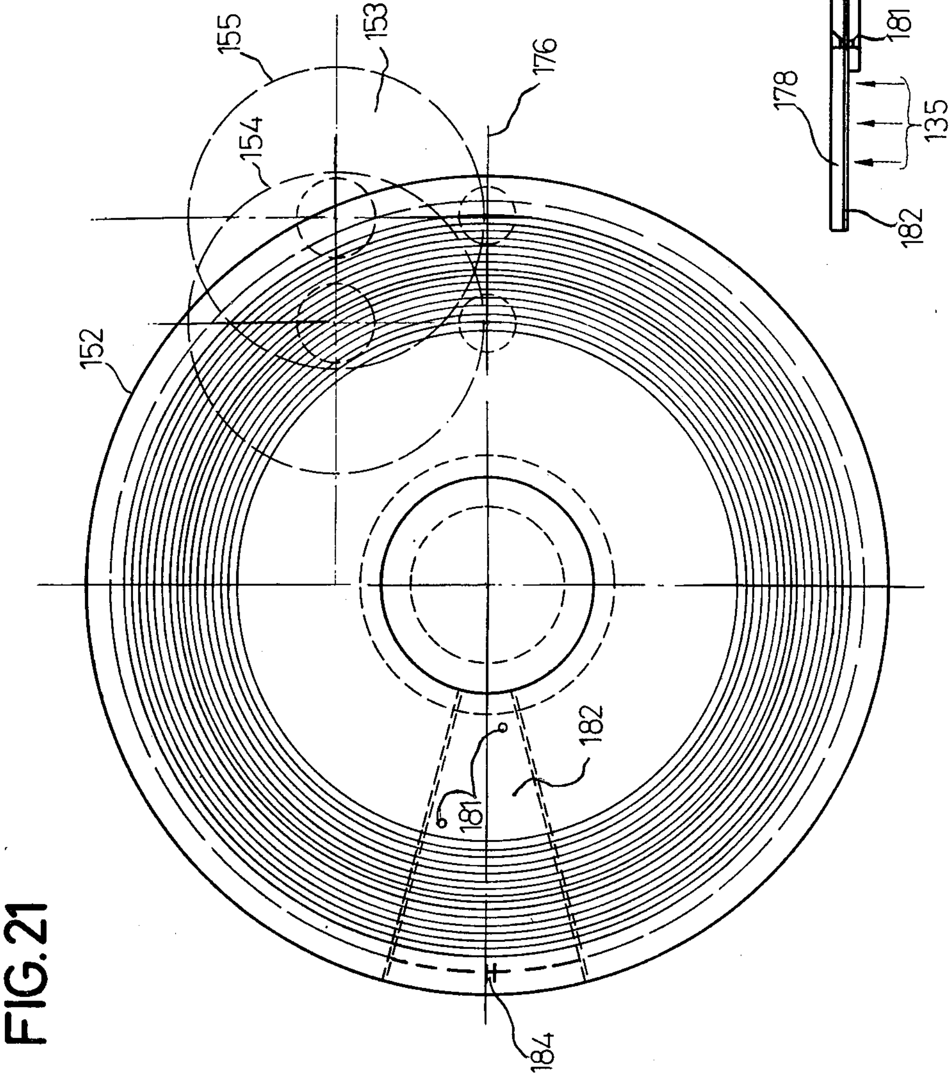
FIG. 21 shows an alternative disc-and-turret arrangement.

Instead of rotating the lens turret for row selection, the turret can be translated in a way similar to the translation of the lens carriage in application Ser. No. 617,847. As shown in FIG. 21, the lens turret, schematically shown at 153, can be moved from position 154 to position 155 so that the lens in use moves along a straight line 176. The advantage of this alternative embodiment resides in the fact that no correction for the angular displacement of the lens for row selection is necessary, but the lens turret assembly must be mounted on a separate slide supported by the main carriage.

CHARACTER FLASH SYSTEM

The illuminating block is shown in FIGS. 9, 10 and 11. A flash-lamp assembly is preferably attached at a fixed location on the base of the machine and the light is transferred by fiber optics bundle 86 which is so shaped that its cross-section at its output end is as shown at 88 in FIG. 11. A prism **88*a* is cemented to the end of the fiber bundle, as shown and located opposite aperture 89. The resulting unit is encased in a block of plastic material 90 which is attached by screws 91 to an arm similar to the one shown at 222 in FIG. 1**.

As an alternative to the illumination system described, a light-pipe capable of illuminating no more than one character at a time can be used. Such a pipe can be moved from row to row by a mechanism located on the base of the machine and a belt operated in a similar way as the system described for the positioning of the lens turret. Alternatively, the light-pipe can be moved by means of a traveling carriage as described in my above-mentioned co-pending U.S. Patent Application Ser. No. 763,611.

SEGMENTED CHARACTER MATRIX

Figure 22:
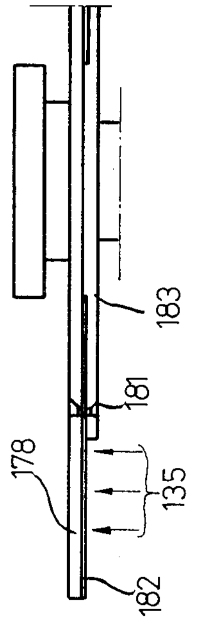
FIG. 22 represents a film segment of the disc of FIG. 21, with the segment being positioned by an air jet.

The disc shown at 152 in FIG. 21 is composed of pie-shaped film segments such as **182*a* accurately located by pins 181 of metal holder 183 (See FIG. 22). The top cover 178 can be of glass or transparent plastic. The film segments can be maintained in a flat plane against the cover by the flow of compressed air as indicated schematically at 135. Each egment is provided with its own timing slits 184**.

FIXED LENSES

A simpler disc and lens assembly is shown in FIGS. 25 to 29. The disc 186 is provided with three character rows **188*a*, *b* and *c*. Each of three lenses 168, 169 and 170 is associated with one row, in a fixed position. The three lenses are shown at 168, 169 and 170. They may be of the same or of different focal lengths, to produce images of the desired size. The lenses are mounted on a removable block 172 (FIG. 26**) so that a group of lenses can be replaced manually by another group to change sizes.

The disc 186 and the lens block 172 are mounted in fixed relationship to one another on a carriage 174 which is movable along rails for character spacing purposes in the manner explained above. The lens block is accurately located by pins such as 171 (FIG. 25) and is secured in place by means of screws 175.

Figure 27:
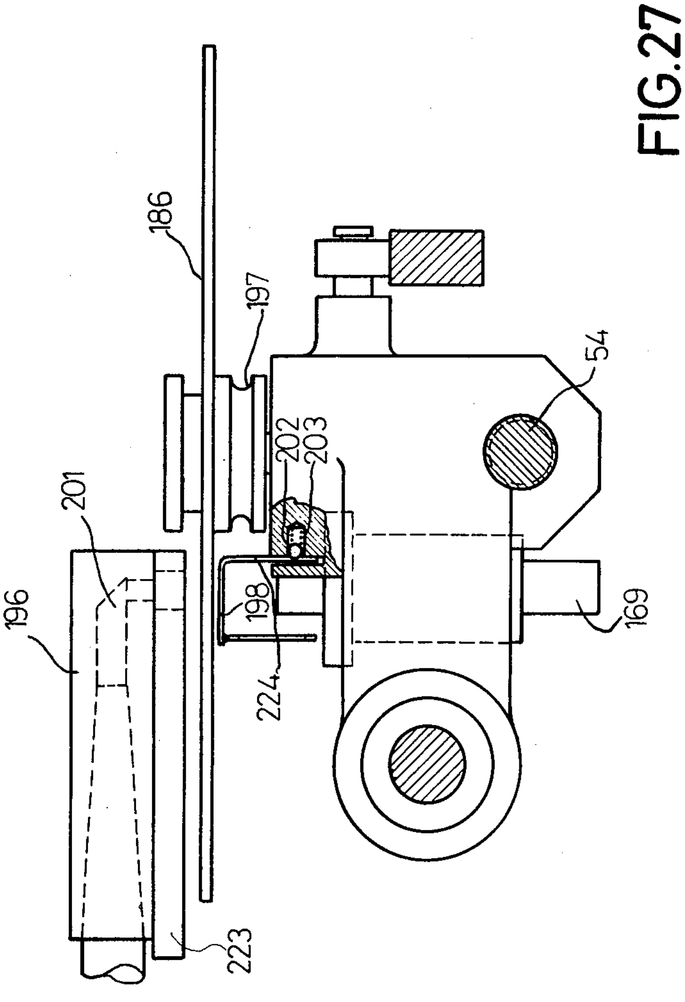
FIG. 27 is a side elevation view of the device of FIG. 25.

When it is desired to change from one row-and-lens combination to another, the carriage is moved the appropriate distance by the character spacing lead screw 54 (FIG. 27).

The inter-row spaces of the disc are used to locate optical tracks such as 179 containing the character width information, preferably in coded form.

Figure 25:
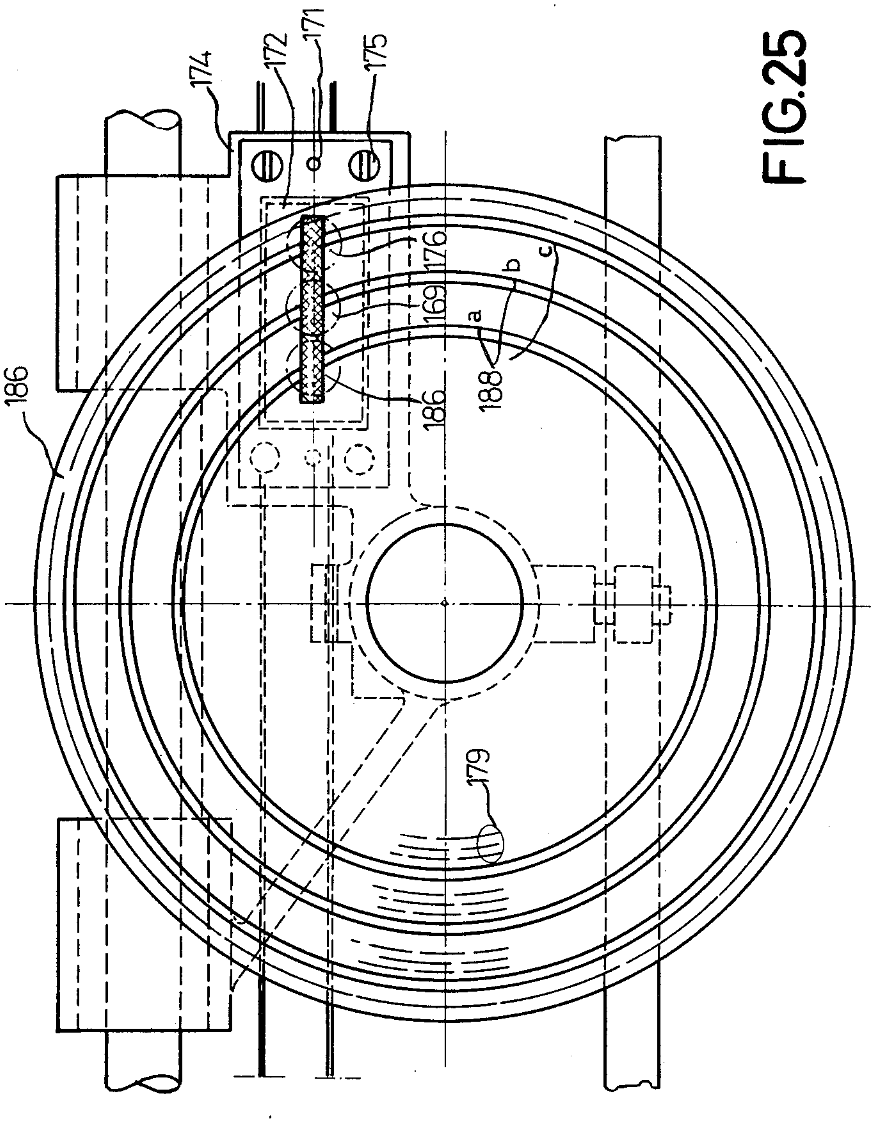
FIG. 25 is a top plan view, partially broken-away, of an alternative machine with a fixed lens block.
Figure 26:
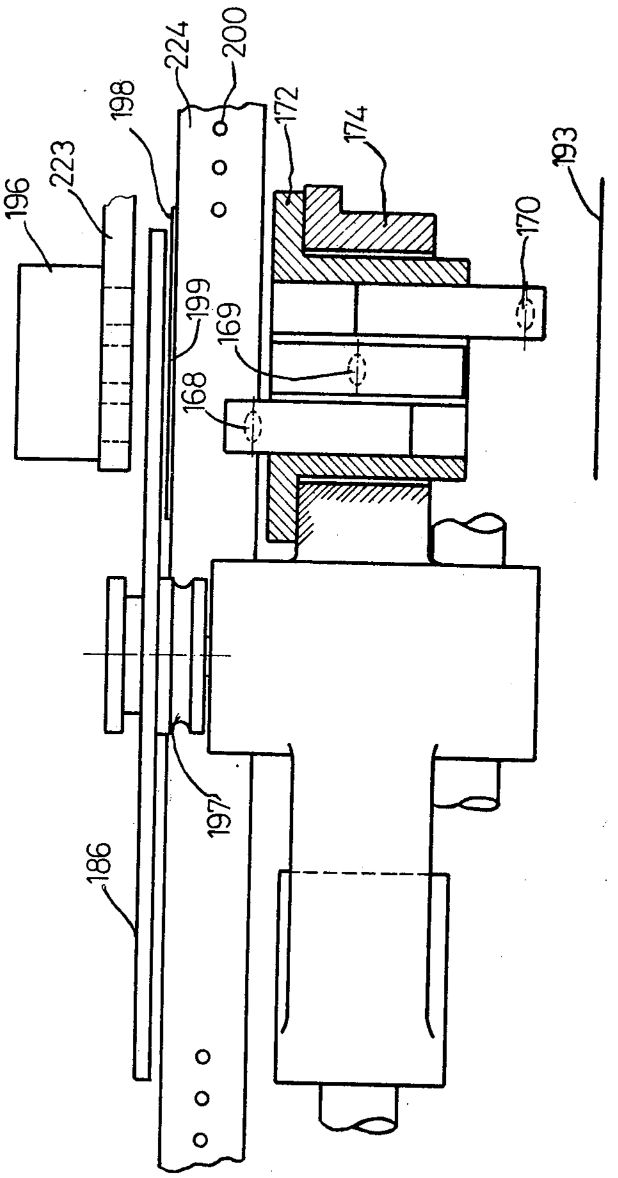
FIG. 26 is a front elevation view, in partial cross-section, of the device of FIG. 25.

The characters located in the shaded projection zone shown in FIG. 25 are illuminated by a prism 201 (FIG. 27) attached to a light pipe or fiber optics bundle, encased in a plastic block 196, which is secured to a plate 223. Selective illumination of the rows is obtained by the displacement of a shutter band 224 in relation to the carriage.

Figure 28:
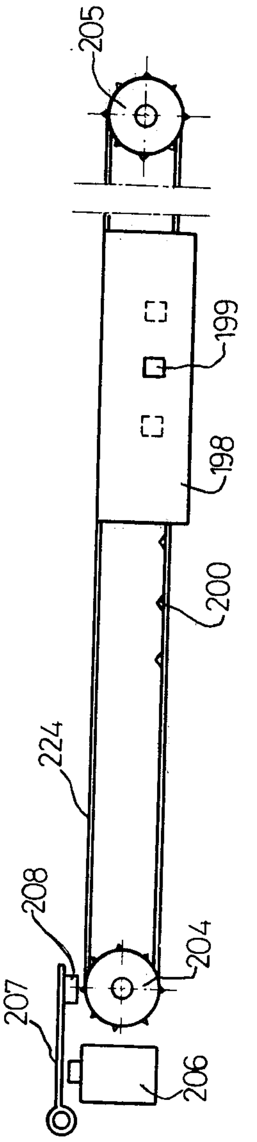
FIGS. 28 and 29 are schematic views of a row illumination control device for the device of FIGS. 25 through 27.
Figure 29:
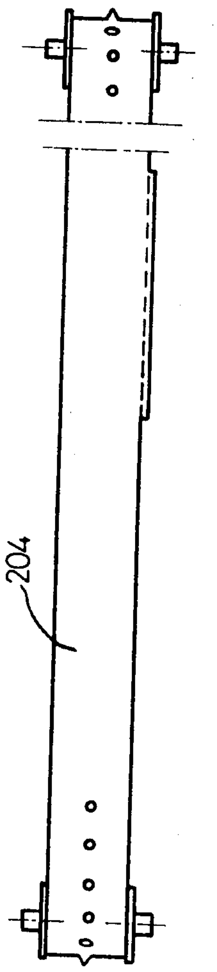

Referring to FIGS. 27 and 28, the shutter band 224 is provided with a section 198 located closely adjacent to the character disc 186 and above the lens block to act as a shutter. This section is provided with an aperture 199 large enough to illuminate a full character area.

The band 224 is normally locked in position in a slot in the disc support member as shown in FIG. 27 by the action of detent comprising a spring 203 and a ball 202. The ball 202 engages recesses or holes 200 provided in the band 224. During the composition of a line of a given style (row) and size (lens), the band moves in unison with the carriage. The band 224 is supported by two sprocketed idlers 204 and 205 (FIG. 28). To move aperture 199 from one location to another, a solenoid 206 is energized to lock sprocket 204 by the action of a show 208 attached to a pivotable lever 207 which is normally disengaged from the sprocket by a spring (not shown). With the shutter band thus locked against displacement, the carriage is moved in the right direction and by the right distance to bring aperture 199 opposite the newly-selected row. Of course, the motion of the carriage forces the spring-loaded ball 202 out of engagement with one recess until it falls into the recess corresponding to the selected row.

Figure 30:
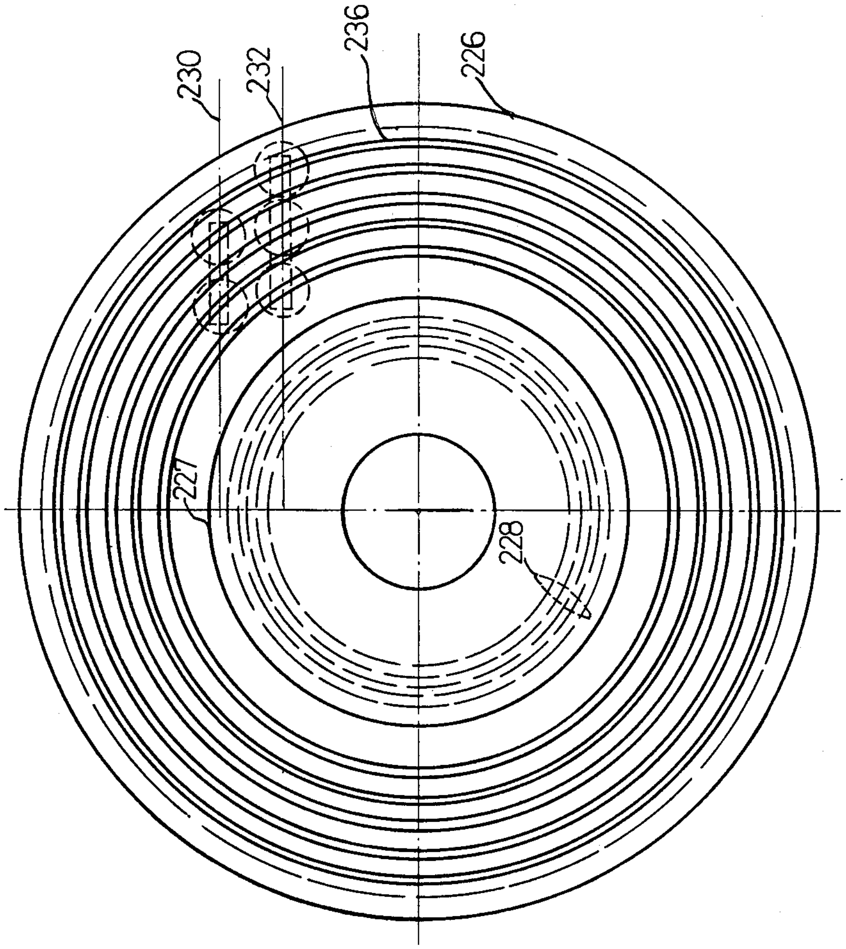
FIG. 30 shows an alternative arrangement of the device of FIGS. 25 through 29, with two offset groups of lenses.

The versatility of the arrangement just described can be increased by the use of five character rows associated with a five-lens block as shown in FIG. 30. The lenses are located in two different positions along line 232 and line 230. The lenses on line 232 are associated with the shaded character rows. Passage from a lens of row 230 to a lens of row 232 necessitates the operation of the film feed mechanism to move the film in one direction or another by the distance between the two rows of lenses.

In FIG. 30, the character widths are stored in the form of coded magnetic information located on tracks 228 on a plastic disc 227 which is cemented to the character disc 226.

Figure 31:
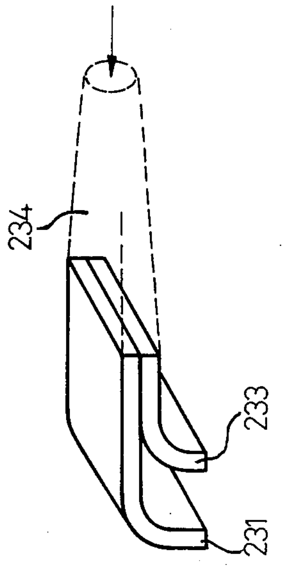
FIG. 31 is a schematic view of another character illuminating light-pipe unit for the machines of the invention.

The illumination of the one lens row or the other is obtained by the use of the light unit of FIG. 31. One row of lenses 232 is illuminated by light guide 231, and the other row by a similar light guide 233. Both are illuminated by fiber optics bundle 234. The selection of the spot to be illuminated is accomplished as described above in relation with FIGS. 28 and 29, except that the section 198 of the shutter band is provided with apertures at two different locations.

Figure 32:
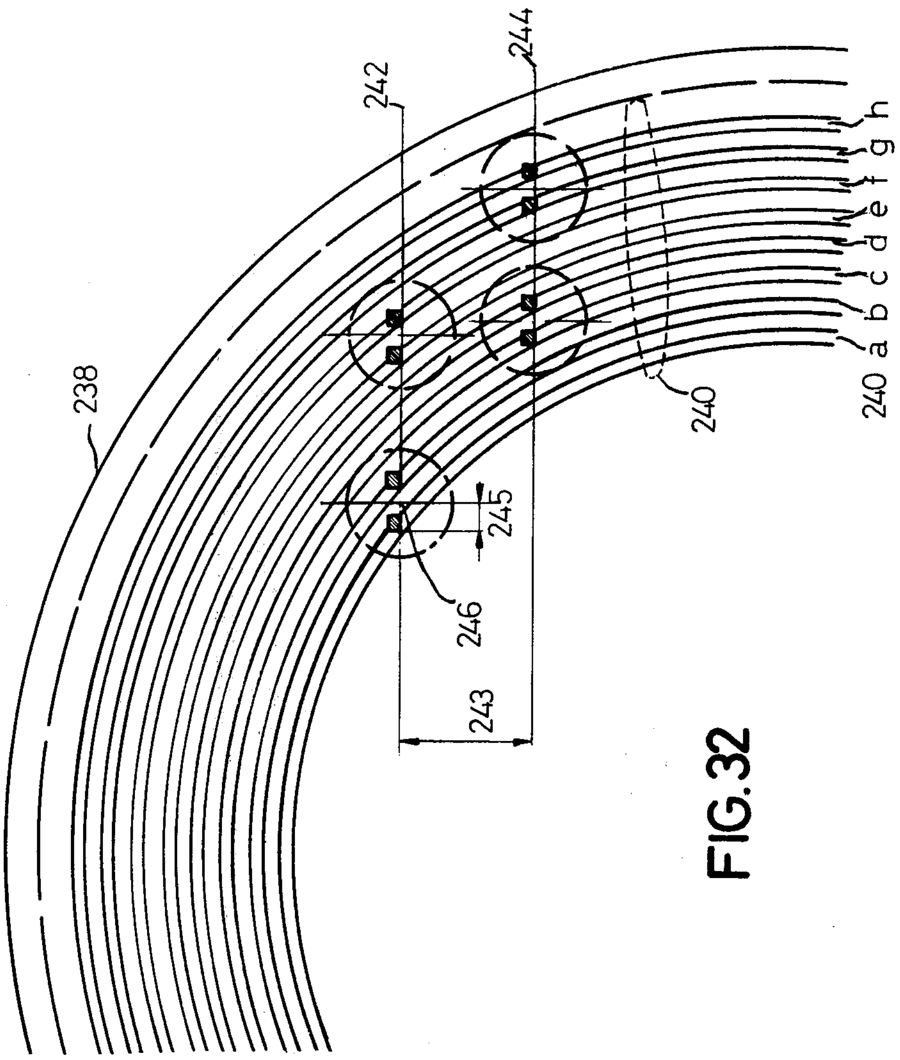
FIG. 32 represents schematically the relative positions of lenses and rows in another embodiment of the invention.

In the arrangement of FIG. 32, an eight-row disc is associated with four lenses. Each lens is positioned between two consecutive character rows, as shown. The change from one row to an adjacent row necessitates a repositioning of the carriage which should take into account the magnification of the associated lens or lenses. Passage from row 242 to 244 is accomplished as explained in relation with FIG. 30.

In one preferred embodiment, a disc with three rows of characters and two fixed lenses is provided. One lens is positioned between rows, as in FIG. 32, and the other lens is aligned with only one row, as in FIG. 25. The latter lens can have a relatively large magnification (e.g. up to 9X to produce 36 point characters from 4 point master characters). The other lens should have a relatively low magnification (e.g. 4X or less, producing 16 point or smaller characters from 4 point master characters) in order to ensure that the lens is far enough away from the disc so that it will form high-quality images from each of the two rows it serves. In this embodiment, it is preferred to use a flash-lamp and flexible, movable light-pipe combination, with the light-pipe being mounted on a traveling carriage, as described above.

INFORMATION STORAGE ON CHARACTER DISC

As mentioned in the description of FIGS. 5 and 6, the character width information, as well as other information, is located on tracks of magnetic spots integral with the character disc 3. In a preferred embodiment, a separate plastic disc 31 (FIG. 5) bearing width information is cemented to the character disc.

Figure 33:
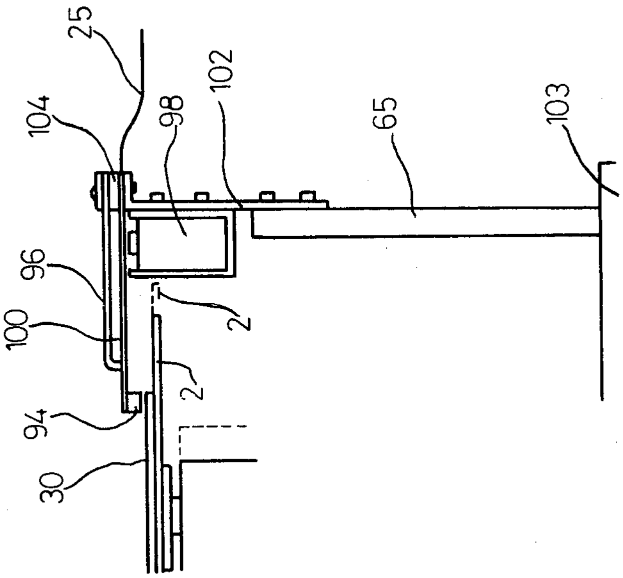
FIG. 33 is a schematic representation of the magnetic read head system for reading tracks of data from the character disc of the invention.

After placing a new disc on the machine, the information contained in the magnetic tracks is transferred to a data storage unit, as will be explained in relation with FIGS. 12 and 33. After placing a new disc on the machine, the operator pushes a "carriage return" button which causes the carriage to move to the right, so that character disc 2 is at the position shown in FIG. 33. In this position, a magnetic read head, shown schematically at 94, is in position to read the first magnetic track of disc 31 and transfer the information it contains to storage via wire 25. Then the carriage is moved one step to the right to read the next track, etc. . . . until the extreme position of disc 2 shown at 2′ is reached. At this position the innermost magnetic track is read. Of course, the magnetic head 94 is pulled down toward the disc by a solenoid 98 before the first track is read, and stays in that position until the last track has been read.

Thus, the character spacing mechanism also is used to read concentric magnetic tracks which bear at least the necessary information pertaining to a given character disc.

The photo-electric device utilized to time the flashes can also be used to start the reading of each track. It can be understood that more than one revolution of the disc may occur for each reading and that the carriage step (for example 0.04 mm) is small enough to pack considerable information in the relatively small area bearing the magnetic tracks.

CHARACTER ALIGNMENT

Preferred means for exact alignment and spacing of characters of different sizes will be explained in relation with FIGS. 18 and 19. FIG. 18 shows a lens block 122 containing 4 lenses 130 of different focal lengths.

It is well known that, as a rule, the optical axis of a lens and the mechanical axis of its barrel usually do not coincide. This is shown in exaggerated form in FIG. 18 where, for example, the optical axis of a lens is shown at 131 and the mechanical axis of its holder at 133. The maximum acceptable eccentricity between the two axes could be specified as a tolerance, for example, dimension 136 shown in FIG. 19.

The lens block is first mounted on a jib, and each lens is successively used, for example as shown in FIG. 20, to project a small image in the form of a dot as shown in the center of FIG. 19 on a target 147. The lens mount is rotated until the image falls on a line on the target representing the base line of characters, and then the lens mount is secured in place by screws or cement. In the case of lens 130, this procedure will produce a lateral shift of the image cause by the eccentricity 129. This can be compensated for by introducing a correction into the carriage stepping mechanism for each lens.

Any residual base-line error can be corrected further by using the testing arrangement of FIG. 20. in this Figure, each lens (e.g. lens 143) is successively brought to a projection check-point by moving the lens slide by the distance between notches engaged by a pawl 149. A source of light (laser) 142 makes an image of a small aperture in a plate 140 through the lens 143 being tested. If the lens 143 is not properly centered, the light rays will follow a path such as 145 rather than the theoretically correct path 144. The aerial image of the small aperture produced on plane 147 is magnified by a fixed lens 146 to project an enlarged and more offset image of the aperture to a bank of small photodiodes 148. The photodiode or photodiodes receiving the light generates a signal which is transmitted to a data storage unit 150 to be used for the electronic correction of the base line by flash delay or by the mechanical correction of spacing by action of the character spacing mechanism.

CONCENTRATION OF MASTER CHARACTERS

The master characters of the disc or drum or strip of photocomposing machines of the kind described are generally spaced from one another to allow room for the widest and tallest character possible. The sizes of these characters determine a "character area" also called "character field" as shown in FIG. 34, which can accommodate upper case characters, wide characters as well as characters with a lower section such as "p", "f", etc. The reference point of the character area is shown at 116 and the base line at 117.

Only a very few characters occupy the full character area. For example, all the upper case characters of the alphabet, except Q utilize only the two top-thirds of the character area and most lower case characters occupy only the central third 252 of the area. FIG. 35 shows the space normally occupied by ten characters (given as an example) on the matrix. All characters are equally spaced vertically, regardless of their actual size or form. FIG. 36 illustrates the space saving that can be achieved if the characters are vertically spaced according to their height.

To simplify this new approach to character positioning on a matrix, the character area height has been divided into three equal sections as shown in FIG. 34, so that "e" occupies one-third of the "standard" area of the matrix, the "t" two-thirds, etc. If can be seen that the character series of FIG. 36 needs only half the space required by the equally spaced characters of FIG. 35. Thus, the size of the matrix (diameter of disc, or drum or length of strip) can be considerably reduced or, preferably the number of different characters on a given matrix can be increased, or the most frequently-used characters can be repeated.

Of course, in order to illuminate one character only at a time it is necessary to have a window of variable width or, preferably, to utilize more than one flash lamp.

FIGS. 39 and 40 represent a unit for the illumination of the characters of FIG. 36. Three light pipes are shown in FIG. 39. These pipes are in the form of flat pieces of glass or plastic bent at right angles and cemented together at their output end 266, after they have been treated to avoid "cross talk", for example by a metallic deposit or a layer of appropriate material. The thickness of each pipe is equal to one-third of the height of a character area of the matrix, and the width of each pipe is equal to the width of the character area. The width "W" (FIG. 39) of the three adjacent pipes is equal to three times the height 252 of FIG. 34. Of course, the end 266 of the pipe is located as close as possible to the matrix.

Light pipe 256 is associated with the upper third of the character area, pipe 258 with the central third and pipe 260 with the lower third. In the example of FIG. 36, only pipe 258 will be illuminated for the first character "e", and pipe 256 and 258 will be simultaneously illuminated for the projection of the "t". For the projection of the character "j", only pipes 258 and 260 would be illuminated, and all the pipes will be used for the projection of such characters as "Q" or vertical bars.

Each light pipe is associated with a separate flash unit through three fiber optic bundles shown in FIG. 40 at 261, 262 and 263. These bundles have ends of the form shown and are preferably cemented to the input end of each light pipe. The whole assembly is preferably encapsulated to form a block 264. Of course, when more than one flash channel is to be used, the two or three flash lamps of the system are fired in unison.

Another advantage of the method described resides in that each flash-lamp is not required to illuminate more than one-third of the total area, so that almost three times more light is available than in systems using a single flash-lamp to illuminate the total character area.

Certain character matrices use characters aligned horizontally as shown in FIG. 37. A similar space saving can be obtained in this case by dividing the widths of a character area into two sections 250 and 251 (FIG. 34). One light pipe is associated with each section and the system operates in a way similar to the one described for vertically-spaced characters.

The above description of the invention is intended to be illustrative and not limiting. Various changes or modifications in the embodiments described may occur to those skilled in the art and these can be made without departing from the spirit or scope of the invention.

I claim:

1. A method of correcting for mis-alignment of the lens in a photocomposing machine, said method comprising establishing a desired base-line on a target, forming and projecting a small image through said lens onto said target, rotating said lens to a position at which said image falls on said line, fastening said lens in said position, measuring the lateral shift of said image due to said rotation, storing information representative of said shift, and utilizing said information to correct the motion of the character spacing mechanism when said lens is being used to project characters so as to accurately locate the character images on a recording surface.

2. A method as in claim 1 in which said image forming step includes projecting a laser beam through a small aperture towards said lens.

3. A method of correcting for mis-alignment of the lens in a photocomposing machine, said method comprising establishing a desired base-line on a target, forming and projecting a small image through said lens onto said target, rotating said lens until said image falls on said line, measuring the lateral shift of said image due to said rotation, storing electrical signals representative of said shift, and utilizing said signal to correct the motion of the character spacing mechanism when said lens is being used to project characters so as to accurately locate the character images on a recording surface, said measuring step comprising establishing a reference position on an array of closely spaced photocells, magnifying the image from said lens and projecting the magnified image onto said array, detecting the distance of said magnified image from said reference position, and converting said distance into electrically coded signals.

4. A device for illuminating master characters recorded on a master character matrix in a projection area of varying size, said area comprising a plurality of zones, a plurality of light projection devices, one for each of said zones, and means for selectively energizing said light projection devices in accordance with the number of zones occupied by each of said characters.

5. A device as in claim 4 in which each of said light projection devices comprises a flash lamp and a light pipe, the output end of said light pipe conforming in shape to one of said zones.

6. A device for illuminating master characters in a projection area of varying size, said area comprising a plurality of zones, a plurality of light projection devices, one for each of said zones, and means for selectively energizing said light projection devices in accordance with the number of zones occupied by each of said characters, said light projection devices comprising a flash lamp and a light pipe, the output end of said light pipe conforming in shape to one of said zones, there being at least three of said light pipes secured together in a sandwich construction, said pipes being stacked vertically with respect to the master characters to be projected.

7. A method of photocomposition, said method comprising the steps of providing a master character matrix with a plurality of master character images recorded thereon, the area on which each master character is recorded comprising one or more contiguous zones of substantially equal size, the number of zones depending upon the size of the character recorded therein, providing a plurality of separate illumination devices for separately and selectively illuminating each of said zones, and selectively operating said illumination devices so as to illuminate only those zones actually occupied by a given master character.

8. A method as in claim 7 in which each of said areas is divided into at least two of said zones, said area being divided by at least one line extending substantially parallel to the base line of the characters.

9. A method as in claim 7 in which each of said areas is divided into at least two of said zones, said area being divided by at least one line extending substantially perpendicular to the base lines of the characters.

* * * * *

UNITED STATES PATENT AND TRADEMARK OFFICE

CERTIFICATE OF CORRECTION

PATENT NO. : 4,248,509

DATED : Feb. 3, 1981

INVENTOR(S) : Louis M. Moyroud

It is certified that error appears in the above–identified patent and that said Letters Patent are hereby corrected as shown below:

Cover Page:

Insert after "[63]" --Division of Ser. No. 771,301, Feb. 23, 1977, Pat. No. 4,148,571, and--.

Between item numbers "[63]" and "[51]" insert:

--[30] Foreign Application Priority Data
Feb. 25, 1976 [GB] United Kingdom 07519/76--.

Column 1, line 4, after "a" insert --division of U.S. Patent Application Ser. No. 771,301, filed February 23, 1977, now U.S. Patent No. 4,148,571, which is a--.

Signed and Sealed this

***Seventh* Day of *September 1982***

[SEAL]

*Attest:*

GERALD J. MOSSINGHOFF

*Attesting Officer* *Commissioner of Patents and Trademarks*